United States Patent
Tuttle

(10) Patent No.: US 7,658,074 B2
(45) Date of Patent: Feb. 9, 2010

(54) MID-MOUNT CENTERBODY HEAT SHIELD FOR TURBINE ENGINE FUEL NOZZLE

(75) Inventor: Mark E. Tuttle, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 624 days.

(21) Appl. No.: 11/513,711

(22) Filed: Aug. 31, 2006

(65) Prior Publication Data
US 2008/0053062 A1    Mar. 6, 2008

(51) Int. Cl.
  *F02C 1/00* (2006.01)
  *F02G 3/00* (2006.01)
(52) U.S. Cl. .............................. 60/737; 60/740; 60/748
(58) Field of Classification Search .................. 60/748, 60/740, 737, 734, 742, 746, 747, 799, 800
See application file for complete search history.

(56) References Cited

U.S. PATENT DOCUMENTS

| 5,269,468 | A  | * | 12/1993 | Adiutori | 239/397.5 |
| 5,423,178 | A  | * | 6/1995  | Mains | 60/776 |
| 5,598,696 | A  | * | 2/1997  | Stotts | 60/779 |
| 5,761,907 | A  | * | 6/1998  | Pelletier et al. | 60/740 |
| 6,076,356 | A  | * | 6/2000  | Pelletier | 60/740 |
| 6,182,437 | B1 |   | 2/2001  | Prociw | |
| 6,622,488 | B2 | * | 9/2003  | Mansour et al. | 60/740 |
| 6,688,534 | B2 | * | 2/2004  | Bretz | 239/8 |
| 2002/0134084 | A1 | * | 9/2002 | Mansour et al. | 60/740 |
| 2007/0137207 | A1 | * | 6/2007 | Mancini et al. | 60/737 |
| 2009/0044538 | A1 | * | 2/2009 | Pelletier et al. | 60/740 |

* cited by examiner

*Primary Examiner*—William H Rodriguez
(74) *Attorney, Agent, or Firm*—Carlson, Gaskey & Olds

(57) ABSTRACT

A fuel nozzle for a gas turbine engine includes an engine mount end and a discharge end that discharges an air/fuel mixture into a combustion chamber. The fuel nozzle includes a centerbody and a heat shield. The heat shield is fixed to the centerbody at a mid-mount position that is centrally located between first and second ends of the heat shield to allow the heat shield to remain thermally isolated from radially adjacent components to reduce the adverse effects of thermal stresses.

19 Claims, 4 Drawing Sheets

MID-MOUNT CENTERBODY HEAT SHIELD FOR TURBINE ENGINE FUEL NOZZLE

BACKGROUND OF THE INVENTION

This application relates to a fuel nozzle with a heat shield mounted within a centerbody to reduce stress levels at an inner air swirler attachment interface.

A fuel injector or fuel nozzle is utilized in a combustion section of a gas turbine engine to discharge an air/fuel mixture into a combustion chamber. The fuel nozzle includes a centerbody that defines a portion of a fuel passage. A heat shield is mounted to the centerbody within an air passage. Air is pre-swirled prior to being mixed with fuel via an inner air swirler (IAS) having a plurality of vanes, with the IAS being fixed to an inner surface of the heat shield. The IAS is fixed to the heat shield by brazing at radially outward tips of the vanes.

In a current attachment configuration between the heat shield and centerbody, the heat shield has a first end that is press fit into the centerbody and a second end that is not attached to the centerbody. The heat shield is directly attached to the centerbody by brazing at a location immediately adjacent the press fit at the first end. Another known mounting configuration has the press fit and heat shield attachment joint fixed to the second end, while the first end is not attached to the centerbody. In either of these configurations, an outer surface of the heat shield is in close proximity or contacts an inner surface of the centerbody along a substantial portion of the axial length of the heat shield such that there is minimal to no gap between the centerbody and the heat shield.

One disadvantage with these known mounting configurations is that at elevated temperatures there is insufficient ability for the heat shield to remain thermally isolated from radially adjacent components. This can result in higher thermal stress levels at attachment interfaces for components attached to the heat shield. For example, these higher thermal stress levels can cause undesirable cracking at the attachment interface between the IAS and the heat shield leading to premature component wear, which is not desirable. Thus, there is a need for a heat shield mounting configuration that reduces the adverse effects of thermal stresses.

SUMMARY OF THE INVENTION

A heat shield is fixed to a fuel nozzle centerbody at a mid-mount position that is centrally located between first and second ends of the heat shield. The first and second ends of the heat shield are received as slip fits within the centerbody. This allows the heat shield to expand freely in opposing axial directions to reduce the effects of thermal stresses in radially adjacent components.

In a disclosed embodiment of this invention, the fuel nozzle is used in a gas turbine engine and includes an engine mount end and a discharge end that discharges an air/fuel mixture into a combustion chamber. A fuel nozzle support extends from the engine mount end to support the centerbody. The centerbody defines a portion of a fuel passage with an inlet end and a discharge or outlet end. The first end of the heat shield is located at the inlet end and the second end of the heat shield is located at the outlet end. An inner air swirler is fixed to an inner surface of the heat shield near the inlet end. The heat shield is fixed to the centerbody at a position that is axially between the inner air swirler and the outlet end. In one example, the outer surface of the heat shield is spaced from an inner surface of the centerbody to form an air gap. This air gap extends along a substantial axial length of the heat shield.

The subject invention provides a heat shield mounting configuration that significantly reduces the effects of thermal stresses on adjacent components when compared to previous designs. These and other features of the present invention can be best understood from the following specification and drawings, the following of which is a brief description.

DETAILED DESCRIPTION OF THE PREFERRED EMBODIMENT

Figure 1:
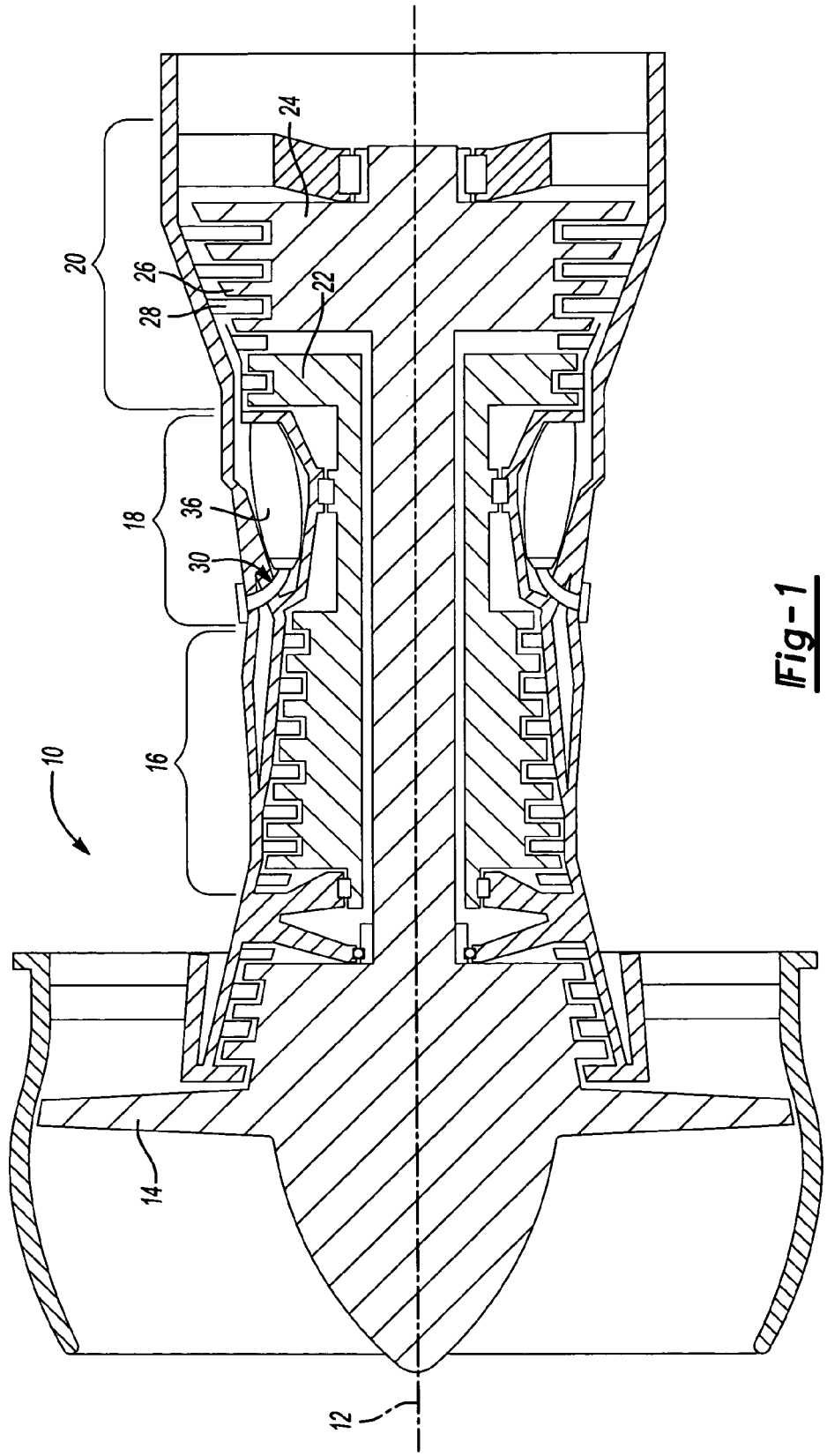
FIG. 1 is a schematic of a gas turbine engine incorporating the present invention.

FIG. 1 shows a gas turbine engine 10, such as a gas turbine used for power generation or propulsion, circumferentially disposed about an engine centerline, or axial centerline axis 12. The engine 10 includes a fan 14, a compressor 16, a combustion section 18, and a turbine 20. As is well known in the art, air compressed in the compressor 16 is mixed with fuel which is burned in the combustion section 18 and expanded in turbine 20. The air compressed in the compressor 16 and the fuel mixture expanded in the turbine 20 can both be referred to as a hot gas stream flow. The turbine 20 includes rotors 22 and 24 that, in response to the expansion, rotate, driving the compressor 16 and fan 14. The turbine 20 comprises alternating rows of rotary blades 26 and static airfoils or vanes 28. FIG. 1 is a somewhat schematic representation, for illustrative purposes only, and is not a limitation of the instant invention, that may be employed on gas turbines used for electrical power generation and aircraft.

Figure 2:
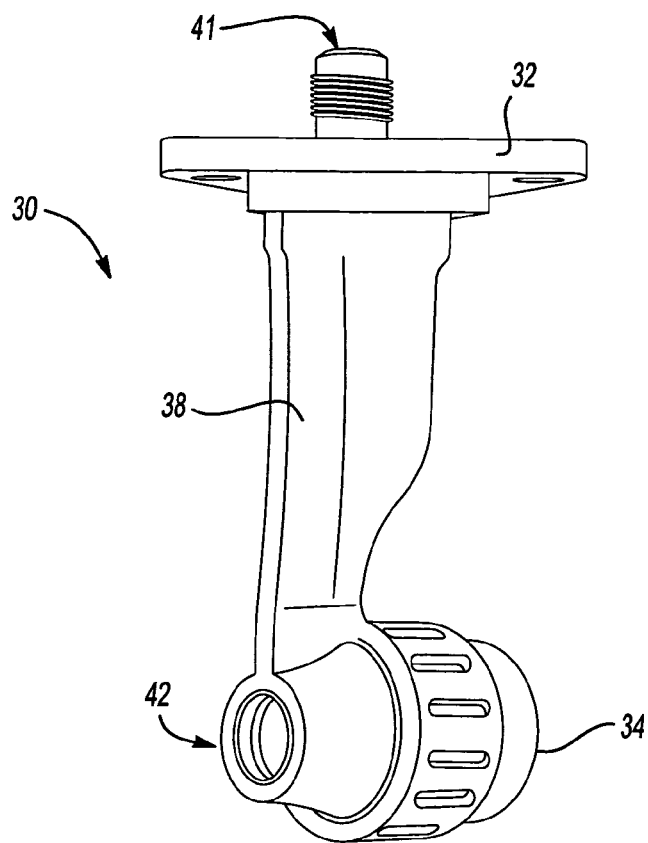
FIG. 2 is a perspective view of a fuel nozzle as used in the gas turbine engine of FIG. 1.
Figure 3:
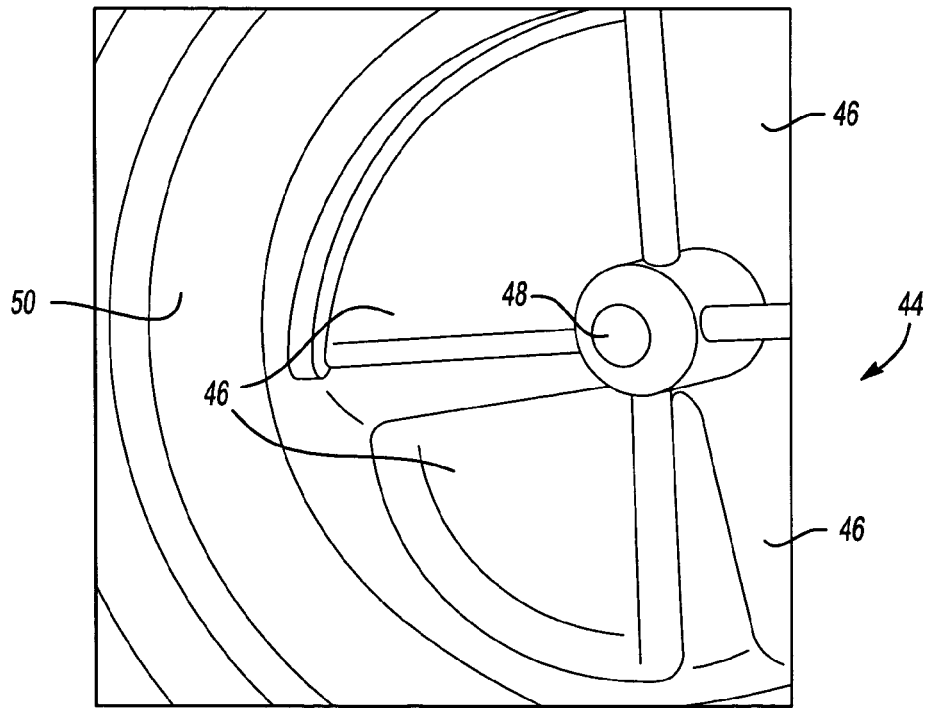
FIG. 3 is an enlarged view of an inner air swirler and heat shield interface.

A fuel injector or fuel nozzle is shown generally at 30 in FIG. 1, and is shown in greater detail in FIG. 2. The fuel nozzle 30 is positioned within the combustion section 18 and includes an engine mount end 32 and a discharge end 34 from which an air/fuel mixture is discharged into a combustion chamber 36 (FIG. 1). The fuel nozzle 30 includes a fuel nozzle support portion 38 that supports a centerbody 40. Fuel enters through an opening 41. Air enters through opening 42 to an air flow passage, and cooperates with an inner air swirler (IAS) 44, which is shown in FIG. 3.

The IAS 44 includes a plurality of vanes 46 that extend radially outwardly from a center hub 48. An outer circumference of the vanes 46 is attached to an inner surface of a heat shield 50 by brazing. The structure and operation of the IAS is known and will not be discussed in further detail.

Figure 4:
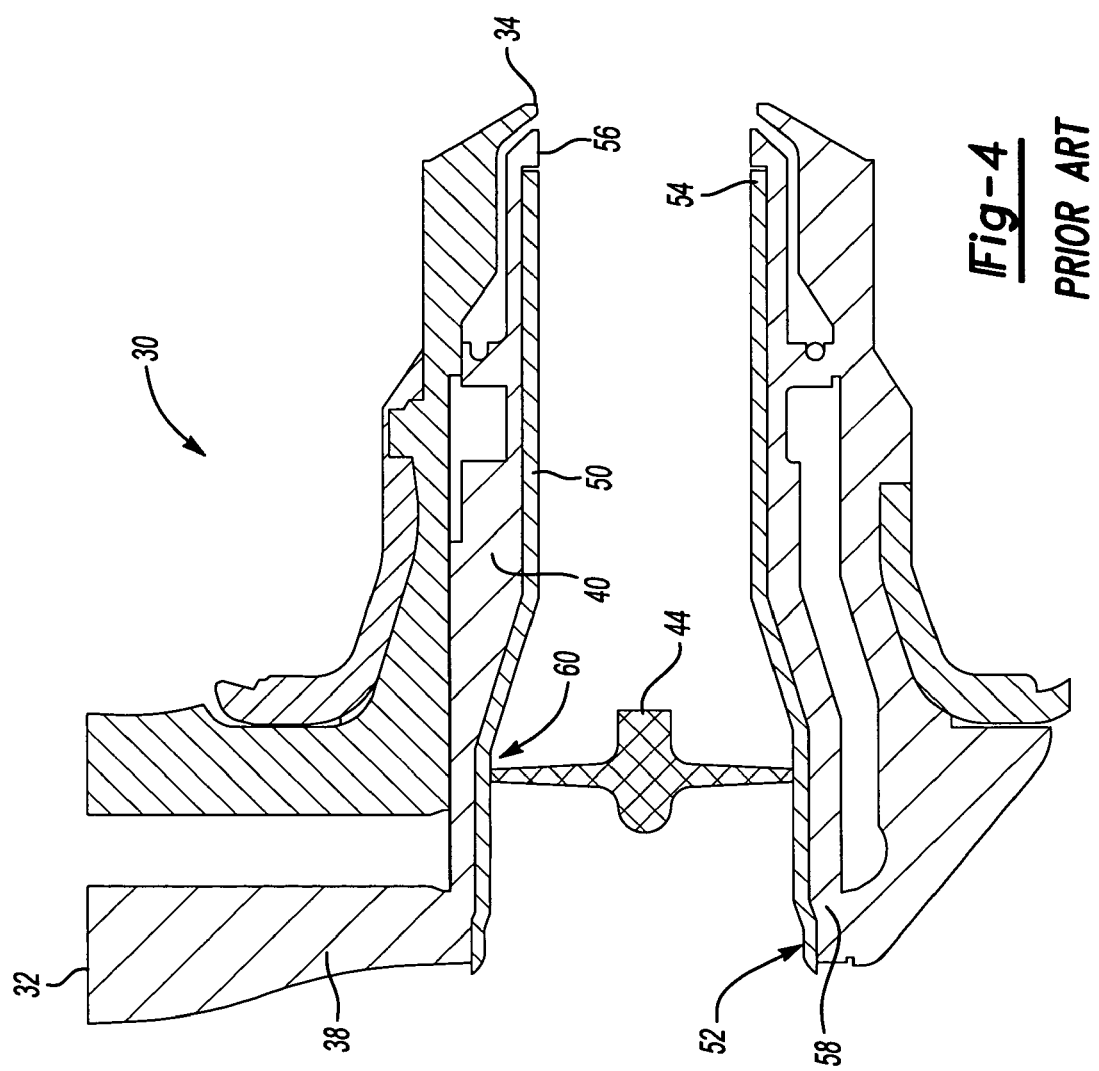
FIG. 4 is a cross-sectional view of a fuel nozzle with heat shield and inner air swirler designed according to the prior art.
Figure 5:
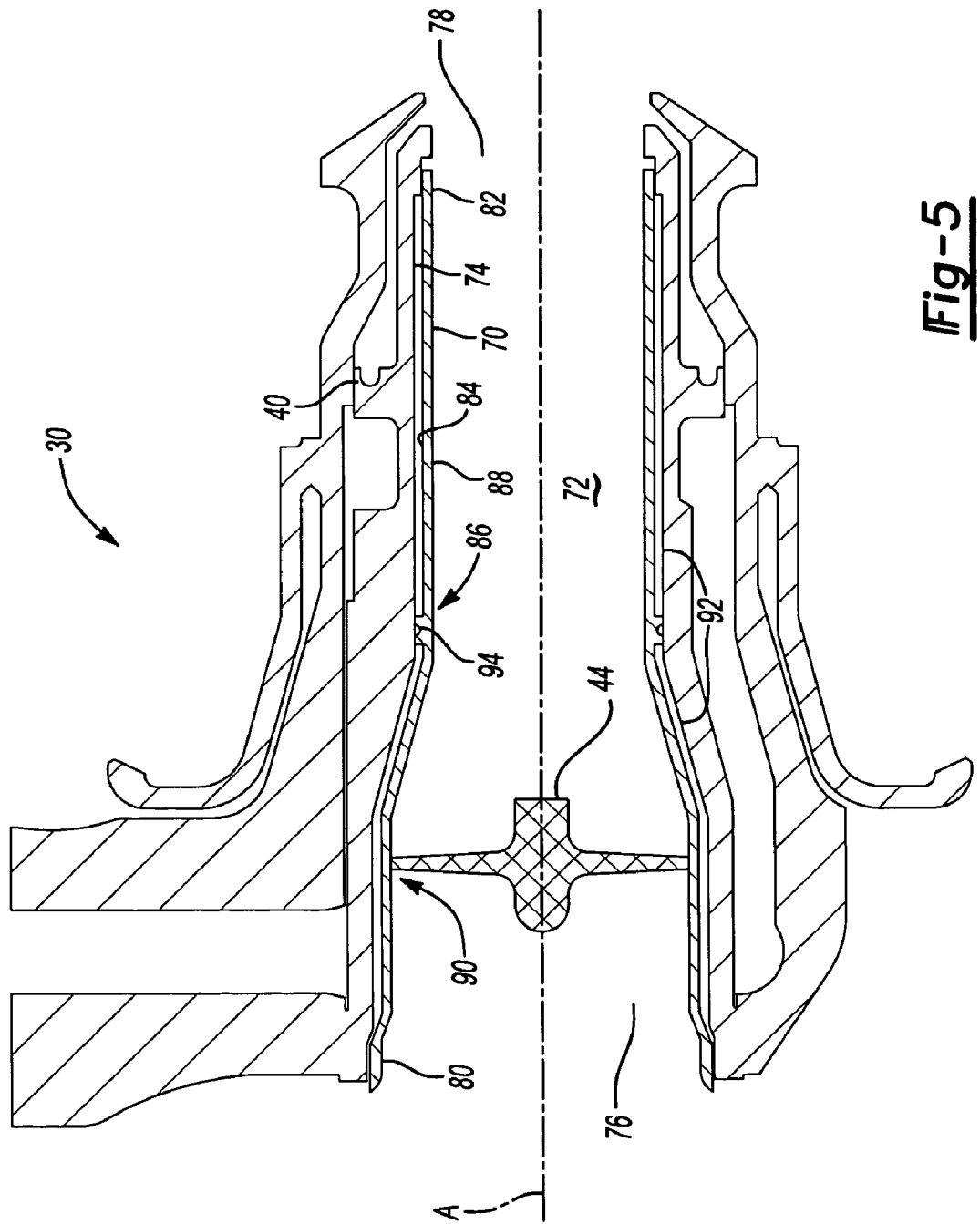
FIG. 5 is a cross-sectional view of a fuel nozzle with heat shield and inner air swirler incorporating the present invention.

A known attachment configuration between the heat shield 50 and centerbody 40 is shown in FIG. 4. In this configuration, the heat shield 50 has a first end 52 that is press fit into the centerbody 40 and a second end 54 that is not attached to the centerbody 40. The heat shield 50 is directly attached by brazing to the centerbody 40 at a location 58 immediately adjacent the press fit at the first end 52. An outer surface of the heat shield 50 is in close proximity or contacts an inner surface of the centerbody 40 along a substantial portion of the axial length of the heat shield 50 such that there is minimal to no gap between the centerbody 40 and the heat shield 50.

One disadvantage with this mounting configuration is that the heat shield does not have sufficient thermal isolation from radially adjacent components in response to increased heat levels. This can result in higher stress levels at attachment interfaces.

Further, as discussed above, the heat shield 50 is directly attached by brazing to the centerbody 40 at a location 58 immediately adjacent the press fit at the first end 52. This traditional mounting configuration can generate high thermal stress levels at this attachment interface. The high thermal stress levels can cause undesirable cracking at the attachment interface between the heat shield 50 and the centerbody 40 leading to premature component wear.

The present invention in part addresses this problem by providing a fuel nozzle 30 with an improved mounting configuration for a heat shield 70. The heat shield 70 is mounted to the centerbody 40, with the inner surface of the heat shield defining an air passage 72. The centerbody 40 defines a central axis A and has an inlet end 76 and a discharge or outlet end 78. The heat shield 70 has a first end 80 positioned at the inlet end 76 and a second end 82 positioned at the outlet end 78.

An outer surface 84 of the heat shield 70 is fixed to the inner surface 74 of the centerbody 40 at a first attachment interface 86. The IAS 44 is attached to an inner surface 88 of the heat shield 70 at a second attachment interface 90 that is spaced apart from the first attachment interface 86 in a direction along the central axis A. In one example, the first and second attachment interfaces comprise brazed joints. The first attachment interface 86 is positioned axially between the second attachment interface 90 and the second end 82 of the heat shield 70. Thus, the first attachment interface 86 comprises a mid-mount location that is positioned generally centrally between the first 80 and second 82 ends of the heat shield 70.

The first 80 and second 82 ends of the heat shield 70 are mounted as slip fits within the centerbody 40. The outer surface 84 of the heat shield is spaced radially apart from the inner surface 74 of the centerbody 40 to form a gap 92. This gap 92 extends along a substantial length of the heat shield 70.

A raised mounting boss 94 is formed on the outer surface 84 of the heat shield 70 and extends in a radial direction toward the inner surface 74 of the centerbody 40. The first attachment interface 86 is located at this raised mounting boss 94.

The IAS 44 and the heat shield 70 are preferably made from Inconel 625 material that provides reduced thermal growth compared to 347SS material used in prior designs.

The present invention utilizes a unique configuration for a heat shield that reduces the effects of thermal stresses to less than 20% of the stresses from existing designs. This significantly reduces the possibility for cracking to occur at an IAS and heat shield attachment interface, increasing the overall wear life of the fuel nozzle.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel nozzle comprising:
   a centerbody having an inlet end and a discharge end for discharging an air/fuel mixture into a combustion chamber; and
   a heat shield positioned within a central passage of said centerbody and having a first end at said inlet end and a second end at said discharge end, wherein an outer surface of said heat shield is only fixed to an inner surface of said centerbody at a mid-mount position located generally centrally between said first end and said second end.

2. The fuel nozzle according to claim 1 wherein said first and said second ends are movable relative to said centerbody in an axial direction to accommodate thermal expansion.

3. The fuel nozzle according to claim 1 wherein said mid-mount position is generally equally spaced from each of said first and said second ends.

4. The fuel nozzle according to claim 1 including an inner air swirler mounted to an inner surface of said heat shield at one attachment interface and wherein said heat shield is fixed to said centerbody at another attachment interface comprising said mid-mount position which is axially spaced from said one attachment interface.

5. The fuel nozzle according to claim 1 wherein said outer surface of said heat shield is radially spaced apart from an inner surface of said centerbody to form an air gap that extends along a substantial length of said heat shield.

6. The fuel nozzle according to claim 1 wherein said heat shield includes a raised boss portion extending radially outwardly from said outer surface of said heat shield, said raised boss portion being directly attached said inner surface of said centerbody.

7. A fuel nozzle comprising:
   a centerbody having an inlet end and a discharge end for discharging an air/fuel mixture into a combustion chamber, said centerbody defining a central axis;
   a heat shield fixed to said centerbody at a first attachment interface between an outer surface of said heat shield and an inner surface of said centerbody, said first attachment interface being located at a mid-mount position, and wherein a first gap is formed between said inner and said outer surfaces on one side of said first attachment interface and a second gap is formed between said inner and said outer surface on an opposite side of said first attachment interface; and
   an inner air swirler fixed to said heat shield at a second attachment interface axially spaced from said first attachment interface in a direction along said central axis and wherein said first attachment interface is positioned axially between said second attachment interface and said discharge end of said centerbody.

8. The fuel nozzle according to claim 7 wherein said inner air swirler is fixed to an inner surface of said heat shield adjacent said first end to form said second attachment interface and with said outer surface of said heat shield being fixed to said centerbody at a centrally located position between said first and said second ends to form said first attachment interface at said mid-mount position.

9. The fuel nozzle according to claim 8 wherein said first and said second ends of said heat shield have slip fit interfaces with said centerbody to allow said heat shield to expand in an axial direction along said central axis.

10. The fuel nozzle according to claim 7 wherein said heat shield is fixed to said centerbody at said mid-mount position by brazing.

11. The fuel nozzle according to claim 7 wherein said heat shield has a first end adjacent said inlet end and a second end adjacent said discharge end, and wherein said first gap extends from said first attachment interface in an axial direction toward said first end and said second gap extends from said first attachment interface in an axial direction toward said second end.

12. The fuel nozzle according to claim 7 wherein said heat shield is only fixed to said centerbody at said mid-mount position.

13. A fuel nozzle comprising:
a centerbody having an inlet end and a discharge end for discharging an air/fuel mixture into a combustion chamber, said centerbody defining a central axis;
a heat shield fixed to said centerbody at a first attachment interface wherein said heat shield has a first end at said inlet end and a second end at said discharge end, and wherein an outer surface of said heat shield is radially spaced apart from an inner surface of said centerbody to form an air gap that extends along a substantial length of said heat shield; and
an inner air swirler fixed to said heat shield at a second attachment interface axially spaced from said first attachment interface in a direction along said central axis with said inner air swirler being fixed to an inner surface of said heat shield adjacent said first end to form said second attachment interface and with said outer surface of said heat shield being fixed to said centerbody at centrally located position between said first and said second ends to form said first attachment interface, and wherein said first attachment interface is positioned axially between said second attachment interface and said discharge end of said centerbody.

14. A fuel nozzle comprising:
a centerbody having an inlet end and a discharge end for discharging an air/fuel mixture into a combustion chamber, said centerbody defining a central axis;
a heat shield fixed to said centerbody at a first attachment interface wherein said heat shield includes a raised boss portion extending radially outwardly from an outer surface of said heat shield, said raised boss portion being directly attached to an inner surface of said centerbody; and
an inner air swirler fixed to said heat shield at a second attachment interface axially spaced from said first attachment interface in a direction along said central axis and wherein said first attachment interface is positioned axially between said second attachment interface and said discharge end of said centerbody.

15. A gas turbine engine comprising:
a fan;
a compressor;
a turbine; and
a combustion section including a plurality of fuel nozzles wherein each fuel nozzle includes a centerbody defining a central axis and having an inlet end and a discharge end for discharging an air/fuel mixture into a combustion chamber, a heat shield fixed to said centerbody at a first attachment interface, and an inner air swirler fixed to said heat shield at a second attachment interface axially spaced from said first attachment interface in a direction along said central axis, and wherein said first attachment interface is positioned axially between said second attachment interface and said discharge end of said centerbody, and wherein said first attachment interface is located at a mid-mount position between an outer surface of said heat shield and an inner surface of said centerbody, and wherein axially extending gaps are formed between said inner surface of said centerbody and said outer surface of said heat shield on opposing sides of said first attachment interface.

16. The gas turbine engine according to claim 15 wherein said heat shield has a first end at said inlet end and a second end at said discharge end with said inner air swirler being fixed to an inner surface of said heat shield adjacent said first end to form said second attachment interface, and with said outer surface of said heat shield being fixed to said centerbody at a centrally located position between said first and said second ends to form said first attachment interface at said mid-mount position.

17. The gas turbine engine according to claim 16 wherein said first and said second ends of said heat shield have slip fit interfaces with said centerbody to allow said heat shield to expand in an axial direction along said central axis.

18. The gas turbine engine according to claim 15 wherein said heat shield is only fixed to said centerbody at said mid-mount position such that first and second ends of said heat shield are movable relative to said centerbody in an axial direction to accommodate thermal expansion.

19. A gas turbine engine comprising:
a fan;
a compressor;
a combustion section including a plurality of fuel nozzles wherein each fuel nozzle includes a centerbody defining a central axis and having an inlet end and a discharge end for discharging an air/fuel mixture into a combustion chamber, a heat shield fixed to said centerbody at a first attachment interface, and an inner air swirler fixed to said heat shield at a second attachment interface axially spaced from said first attachment interface in a direction along said central axis, and wherein said first attachment interface is positioned axially between said second attachment interface and said discharge end of said centerbody; and
wherein said first and said second ends of said heat shield have slip fit interfaces with said centerbody to allow said heat shield to expand in an axial direction along said central axis, and wherein said outer surface of said heat shield is radially spaced apart from an inner surface of said centerbody to form an air gap that extends along a substantial length of said heat shield.

* * * * *

UNITED STATES PATENT AND TRADEMARK OFFICE
CERTIFICATE OF CORRECTION

| | | |
|---|---|---|
| PATENT NO. | : 7,658,074 B2 | Page 1 of 1 |
| APPLICATION NO. | : 11/513711 | |
| DATED | : February 9, 2010 | |
| INVENTOR(S) | : Mark E. Tuttle | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 786 days.

Signed and Sealed this

Twenty-eighth Day of December, 2010

David J. Kappos
*Director of the United States Patent and Trademark Office*